D. J. POWERS.

Tightening Devices for Woven-Wire Mattresses.

No. 9,104. Reissued Mar. 2, 1880.

Witnesses:
C. W. Bond
L. L. Bond

Inventor:
Daniel J. Powers

N. PETERS, PHOTO-LITHOGRAPHER, WASHINGTON, D. C.

UNITED STATES PATENT OFFICE.

DAVID J. POWERS, OF CHICAGO, ILLINOIS.

TIGHTENING DEVICE FOR WOVEN-WIRE MATTRESSES.

SPECIFICATION forming part of Reissued Letters Patent No. 9,104, dated March 2, 1880.

Original No. 136,180, dated February 25, 1873. Application for reissue filed February 20, 1879.

*To all whom it may concern:*

Be it known that I, DAVID J. POWERS, of Chicago, in the county of Cook and State of Illinois, have invented certain new and useful Improvements in Woven-Wire-Mattress Frames; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
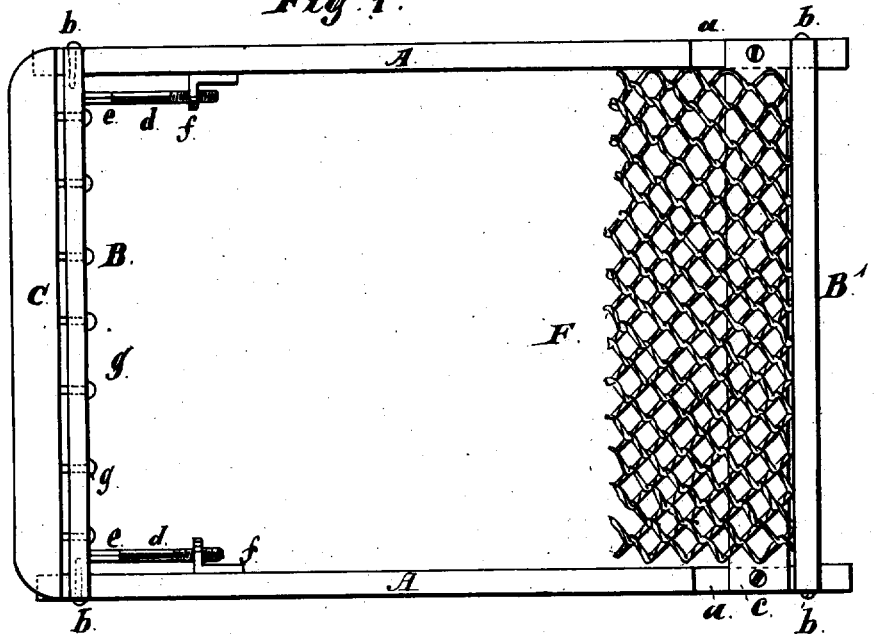
Figure 2:
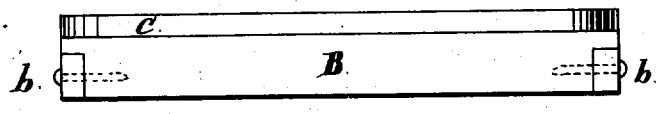
Figure 3:
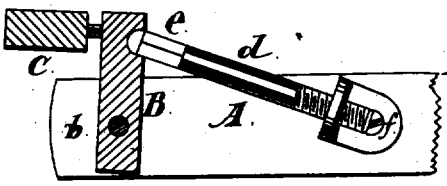
Figure 4:
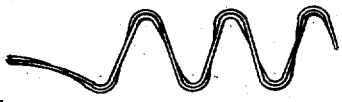

Figure 1 is a plan; Fig. 2, a view of one end, and Figs. 3 and 4 enlarged details.

The objects of my invention are to so construct the frame which holds the woven wire that it can be readily taken apart for transportation and other purposes, to provide a ready method of tightening the woven wire, and to improve the wire itself.

In the drawings, A A are the side pieces of the frame. B B′ are end pieces placed within the side pieces, and pivoted thereto by means of bolts *b*, so that these end pieces can have a rocking movement. The woven wire F may be secured to these end pieces in any suitable manner. As shown, it is secured to them by means of two strips of wood, C *c*, the former being on the outside of piece B, and the latter on the inside of piece B′, the ends of the woven wire being placed between the end pieces and the strips C *c*, and secured in place by suitable bolts *g*.

*d d* are bolts having one part, *e*, thereof square, and a screw-thread on the other ends, fitting brackets or nuts *f*, which are attached to the inside of the side pieces, A. The heads of these bolts are inserted in small cavities near the upper edge of the swinging end piece, B.

By means of a wrench applied to the square portion *e* of the bolt *d* it can be turned so that the tension of the woven wire can be increased or diminished at pleasure.

Both end pieces may be made adjustable, as described, though it will usually be sufficient to make one adjustable, in which case B′ may be held in an upright position by brackets or stops *a*, and the strip *c* may be bolted to the side pieces. By removing the bolts *b* and those which secure the strip *c* in place, the woven wire and the end pieces can be rolled up, and the whole can be easily packed for shipment.

I make the woven wire F from wire composed of two or more strands twisted together before it is coiled, (see Fig. 4,) for the purpose of increasing its strength without impairing its elasticity.

It will be seen from the construction of the bed-bottom that the side rails directly support the end rails and the straining devices.

By attaching the nuts of the straining-bolts to the side rails and locating them inside, or so as to be out of the way of the framing of the bedstead, the straining can be accomplished without removing the mattress-frame from its position.

What I claim as new is as follows:

1. The straining-bolts *d d*, in combination with the side rails, A, and a rocking end rail, substantially as and for the purpose specified.

2. The combination, with the side and end rails, of the pressure straining-bolts *d*, located between the end rails, and having one end connected with the supporting side rail and the opposite end with a yielding or movable end rail, substantially as specified.

DAVID J. POWERS.

Witnesses:

L. L. BOND,

O. W. BOND.